United States Patent [19]
Jordan

[11] Patent Number: 5,382,043
[45] Date of Patent: Jan. 17, 1995

[54] SUSPENSION ALIGNMENT DEVICE

[76] Inventor: Mark P. Jordan, P.O. Box 4240, Halfmoon, N.Y. 12065

[21] Appl. No.: 149,125

[22] Filed: Nov. 5, 1993

Related U.S. Application Data

[63] Continuation of Ser. No. 771,821, Oct. 7, 1991, abandoned, which is a continuation of Ser. No. 226,618, Aug. 1, 1988, abandoned.

[51] Int. Cl.⁶ .............................................. B62D 17/00
[52] U.S. Cl. ................................................... 280/661
[58] Field of Search ..................... 280/660, 661, 668; 411/116, 169, 539

[56] References Cited

U.S. PATENT DOCUMENTS

| | | | |
|---|---|---|---|
| 3,526,413 | 9/1970 | Muller | 280/96.2 |
| 3,917,308 | 11/1975 | Schultz | 280/661 |
| 4,313,617 | 2/1982 | Muramatsu et al. | 280/661 |
| 4,424,984 | 1/1984 | Shiratori et al. | 280/661 |
| 4,530,512 | 7/1985 | Eulanou | 280/661 |
| 4,577,534 | 3/1986 | Rayne | 81/484 |
| 4,706,987 | 11/1987 | Pettibone et al. | 280/661 |
| 4,718,691 | 1/1988 | Specktor et al. | 280/661 |
| 4,733,884 | 3/1988 | Pettibone et al. | 280/661 |
| 4,753,454 | 6/1988 | Woehler | 280/661 |
| 4,795,187 | 1/1989 | Ingalls | 280/661 |

FOREIGN PATENT DOCUMENTS 358127 10/1931 United Kingdom ................ 411/169

Primary Examiner—Richard M. Camby
Attorney, Agent, or Firm—Kevin R. Kepner

[57] ABSTRACT

An alignment adjusting device for an independently suspended vehicle wheel particularly useful for Macphearson strut type suspensions which consists of a one piece eccentric nut-washer combination that allows a quick and easy method to adjust camber. The device can be installed without modifications to the vehicle and allows the alignment technician to adjust the camber without the need to remove the alignment instrumentation.

10 Claims, 8 Drawing Sheets

SUSPENSION ALIGNMENT DEVICE

This is a continuation, of application Ser. No. 07/771,821, filed Oct. 7, 1991 now abandoned, which is a continuation of Ser. No. 07/226,618 filed Aug. 19, 1988 now abandoned.

This invention relates to wheel alignment adjusting devices and, more particularly, to a camber and or caster adjusting device for vehicles with independently suspended wheels.

Conventional alignment adjusting devices used for adjusting camber, caster, and toe for independently suspended wheels are found in various prior U.S. Patents.

U.S. Pat. No. 3,526,413 to Muller discloses a camber and caster adjusting device including eccentric elements arranged in the joints of guide members which support the wheel as in what is typically referred to as an A-frame type suspension.

U.S. Pat. No. 3,917,308 to Schultz discloses a camber and toe adjusting device for strut-type suspensions utilizing through bolt fasteners holding a clamping bracket on the strut lower end to the neck portion of a wheel support knuckle. An eccentric element is located on one bolt and trapped between guide surfaces on the holding clamp. The eccentric element is rotatably adjustable to force the clamp and knuckle angularly to varying camber relationships.

The U.S. Pat. No. 4,313,617 to Muramutsu et al. discloses a camber adjusting device including an an eccentric adjustment piece rotatably provided on the steering knuckle. Rotation of the piece causes the strut support bracket to be displaced about the knuckle by a valve of eccentricity of the piece whereby the strut is displaced with respect to the steering knuckle adjusting the camber angle.

The U.S. Pat. No. 4,424,984 to Shiratori et al. discloses a camber adjusting device including a hollow shaft with a disk-shaped cam disposed at one end and a non round fit portion on the other end, an engaging member having a non round hole into which the fit portion of the hollow is inserted and having a cam surface with a profile the same as the end of the hollow shaft, and a bolt which hollow tube is oscillatably supporting a suspension arm by insertion into slots in the fixed supporting member. The bolt is inserted through the hollow tube and into the engaging member, rotation of the engaging member cause a relative displacement of the tube within the mounting slots.

The U.S. Pat No. 4,577,534 to Rayne discloses an eccentric cam socket tool which, when engaged with the nut of a through bolt fastener on the strut lower end and related, allows camber. adjustment to be obtained.

The U.S. Pat. No. 4,706,987 to Pettibone discloses a camber adjusting device which utilizes an eccentric bolt element in combination with a bracket having parallel flanged surfaces upon which the eccentric element is rotably adjustable, thereby providing a means for camber adjustment.

The shortcomings of the prior inventions range from the expense of installing replacement parts as in the Muller, Schultz and Muramatsu patents, the requirement that the invention be incorporated as original equipment by the manufacturer, as in the Shiratori and Muramatsu patents, the difficulty of use as in the Rayne patent, or the ineffectiveness of the invention as in the Pettibone patent.

SUMMARY OF INVENTION

It is an object of present invention to provide an effective, inexpensive and easily installed device for the adjustment of the suspension to which it is applied thus overcoming the disadvantages of prior art described above.

It is an additional advantage of this invention that it can be installed without removing the wheel alignment equipment or the wheel of the vehicle upon which it is being installed. This enables the technician making the adjustment to perform the entire alignment adjustment without the necessity of multiple equipment hook-ups. It is a further advantage that this invention, when installed, does not require great force to be applied such as is required to engage the socket-type adjusting device mentioned above. The prefer red embodiment described herein is particularly suitable to strut-type suspensions, however, it is not limited thereto as other applications are readily apparant.

DESCRIPTION OF THE PREFERRED EMBODIMENTS

Figure 1:
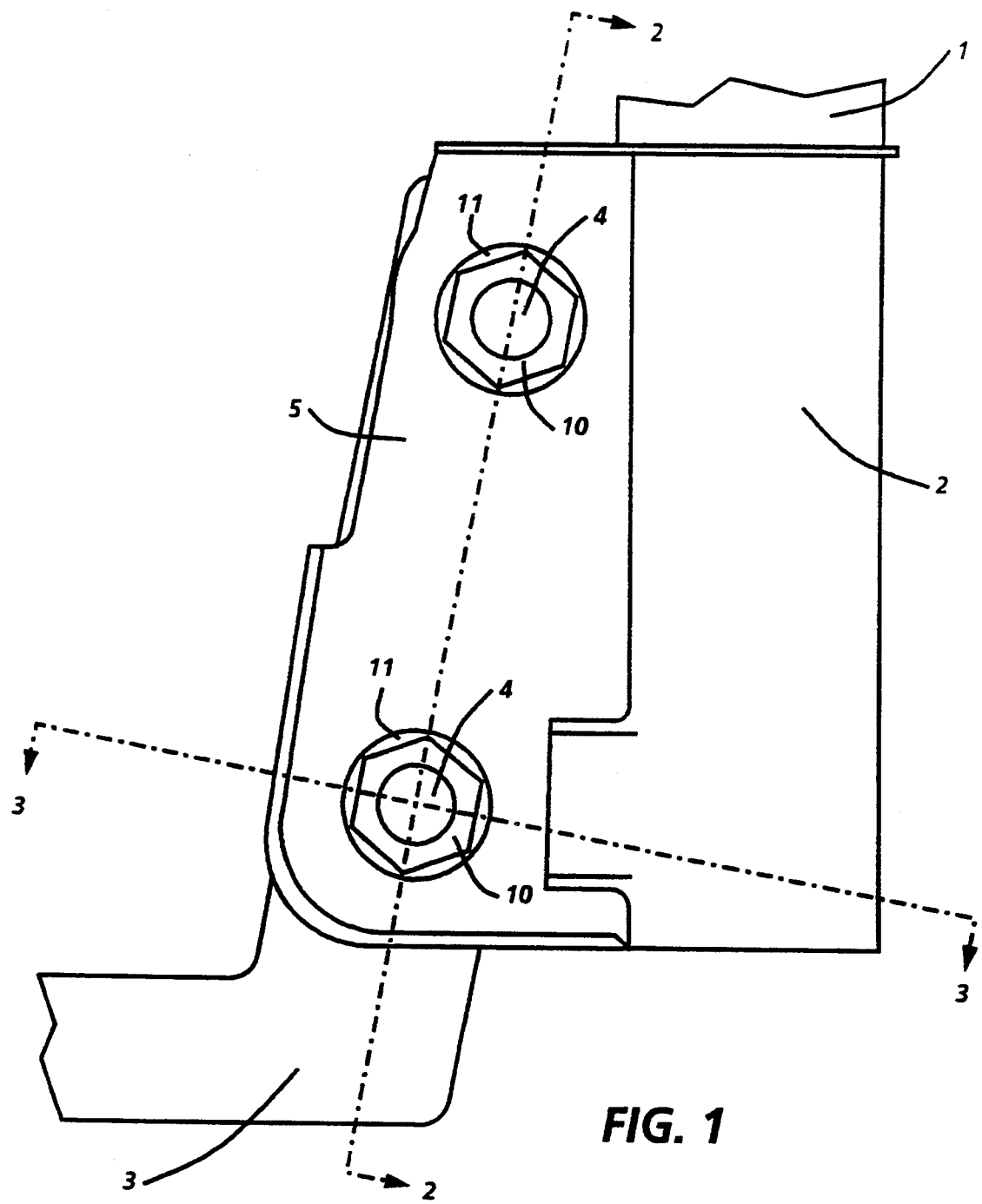
FIG. 1 is a side view showing a typical example of the clamp arrangement at the lower end of a strut in a strut-type suspension into which the camber adjusting device is assembled.
Figure 2:
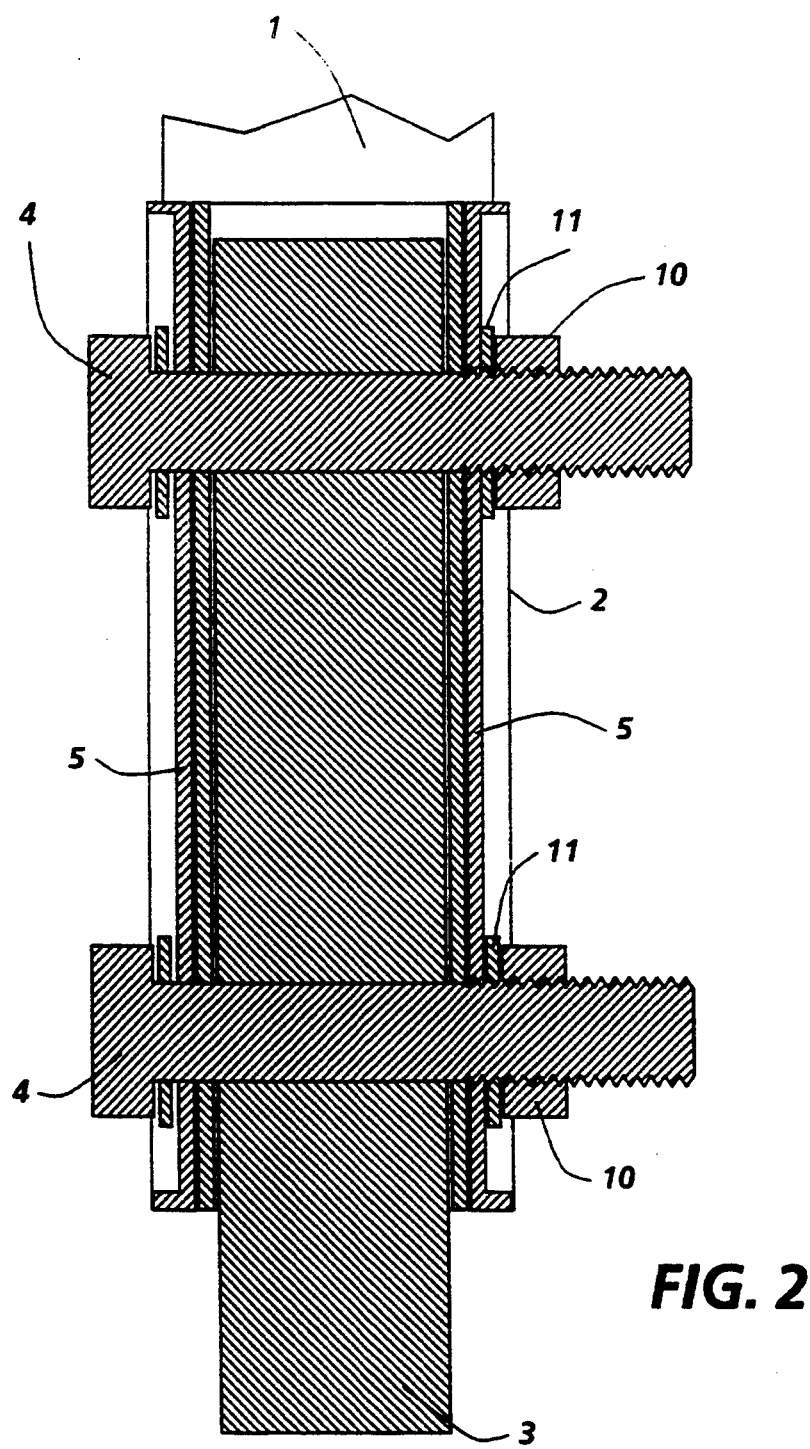
FIG. 2 is a sectional view taken along line AA in FIG. 1.
Figure 3:
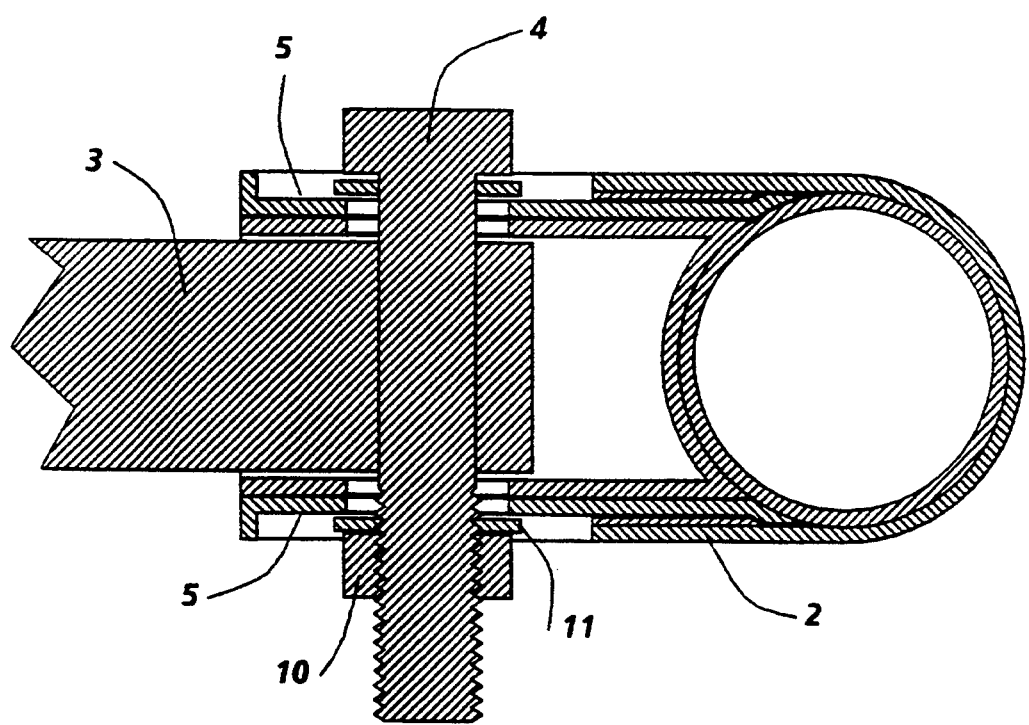
FIG. 3 is a sectional view taken along line BB in FIG. 1.
Figure 4:
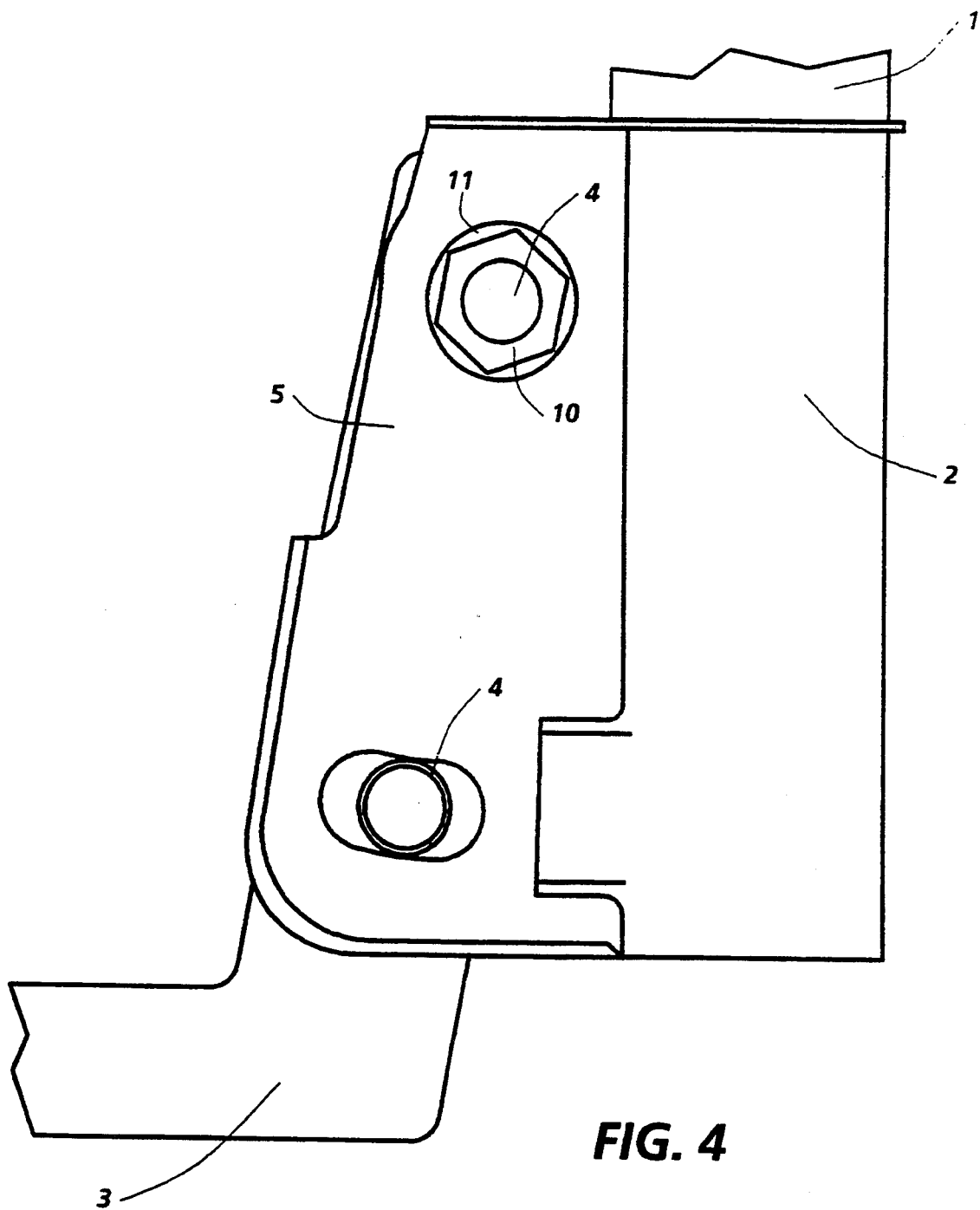
FIG. 4 is a side view of a typical clamping member with the nut removed from the lower clamp bolt.

With reference to FIG. 1, it is seen that the front wheel of a motor vehicle is coupled to the vehicle frame or structure by means of a Macphearson strut member 1, a clampable mounting link 2 and a wheel support member 3 or steering knuckle. The clampable mounting link 2 is generally a U-shaped member and is attached around the lower end of the strut member 1, the wheel support member is then retained by means of two through bolts 4 which pass through the legs 5 of the mounting link between which the support member 3 is positioned. The lower mounting hole 7 in the support member 2 is positioned in vertical alignment with the upper mounting hole 6. The lower holes 7 in the mounting link legs 5 are horizontal slots. There are shoulders 8 formed in the mounting link horizontally adjacent to the lower bolt mounting slot 7. In the preferred embodiment, the camber adjustment is robotically set at the factory and the clampable mounting link 2 is attached to the wheel support member by means of conventional hex head through bolts 4, washers 11 and nuts 10. This is accomplished by the precise movement of the lower through bolt 4 in the lower mounting slots 7 which rotates the wheel support 3 about the pivot point of the upper mounting bolt 4 as shown in FIG. 4, thereby achieving the desired camber setting.

To provide post assembly camber adjustment, it is generally necessary to loosen the upper and lower mounting bolts 4 and to physically manipulate the wheel support 3 until the proper camber setting is obtained. This manipulation requires the presence of two persons and, due to the weight of the wheel components, it is difficult to maintain the proper setting once reached while the bolts are being tightened.

Figure 5:
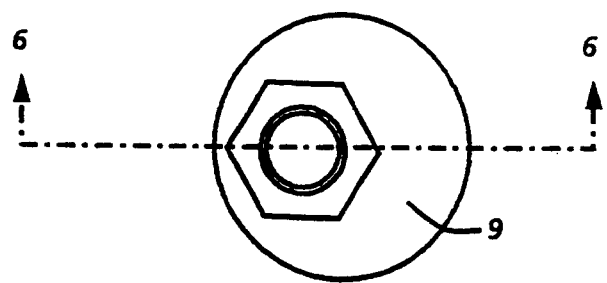
FIG. 5 is a side view of the eccentric nut camber adjusting device.
Figure 6:
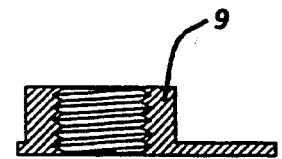
FIG. 6 is a sectional view taken along line DD of FIG. 5.
Figure 7:
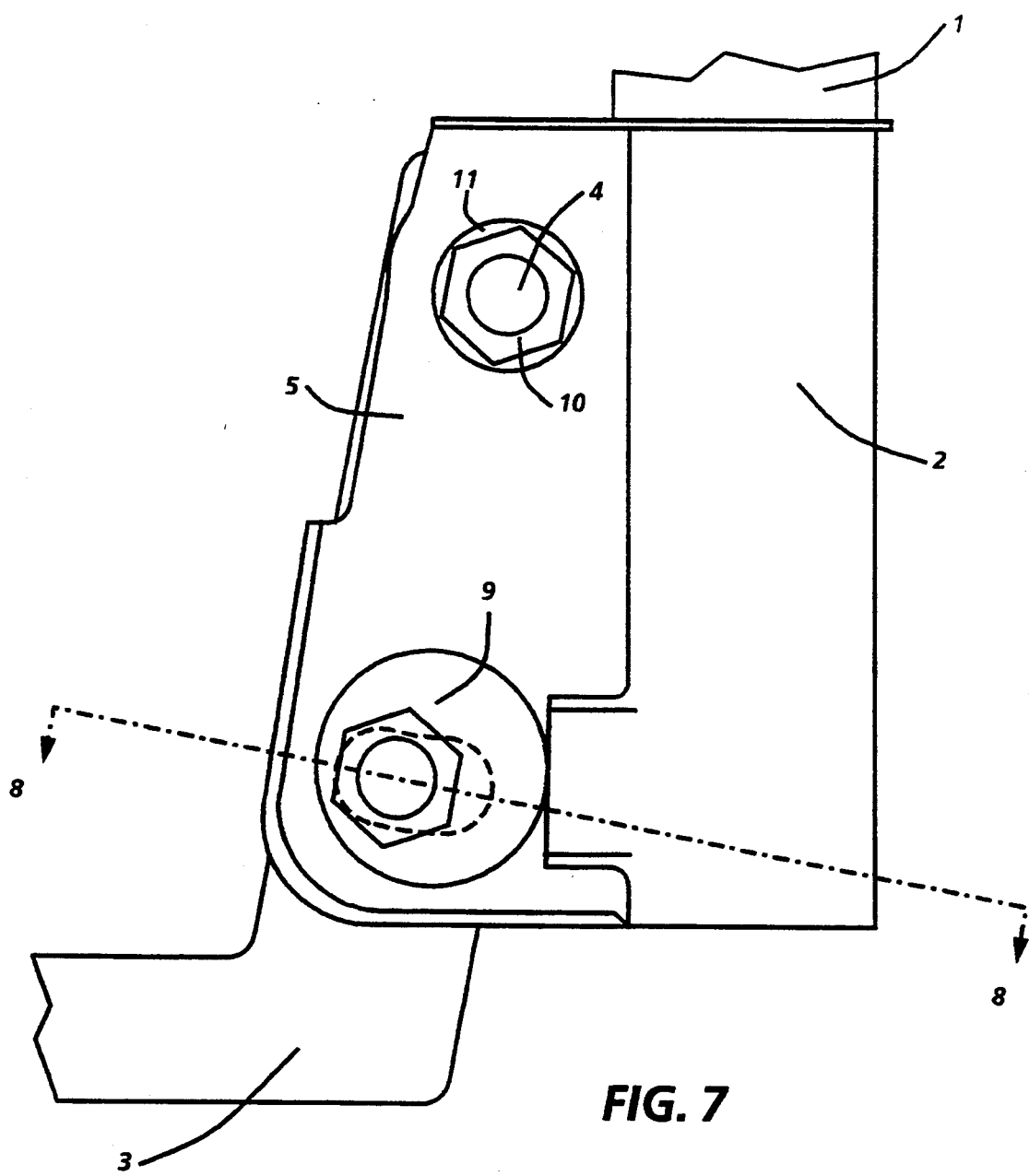
FIG. 7 shows a side view of a typical clamping member with the eccentric camber adjusting device installed.
Figure 8:
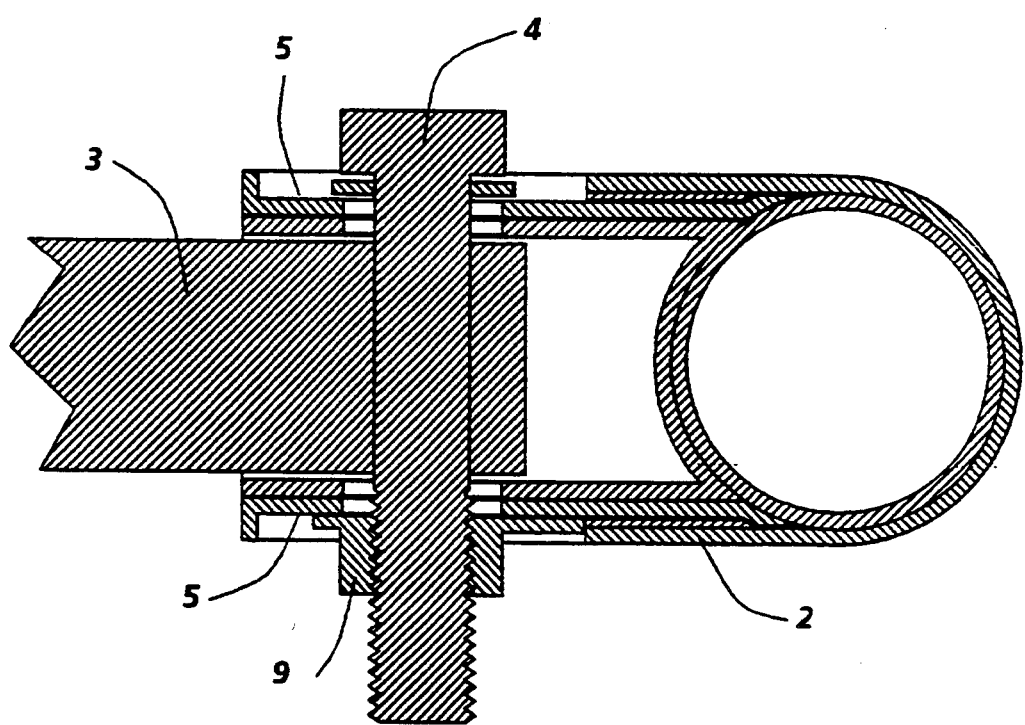
FIG. 8 is a sectional view taken along line CC of FIG. 7.

As shown in FIG. 7, the preferred embodiment provides an eccentric adjusting element 9, which is detailed in FIG. 5, in the form of a nut-washer combination 9 which replaces the standard washer 11 and nut 10. The eccentric portion 9 of the device is rotatably adjustable with regard to the shoulders 8 formed in the mounting link 2. As the device 9 is rotated, the mounting bolt 4 is displaced horizontally in the lower mounting slot 7 until the proper camber setting is obtained. Once the proper setting is obtained, the adjusting device 9 can be held in position by means of a standard socket-type or open end wrench and the bolt can be tightened from the bolt-head side. This embodiment enables the proper post assembly camber setting to be obtained and the mounting bolts to be tightened by a single individual.

Figure 9:
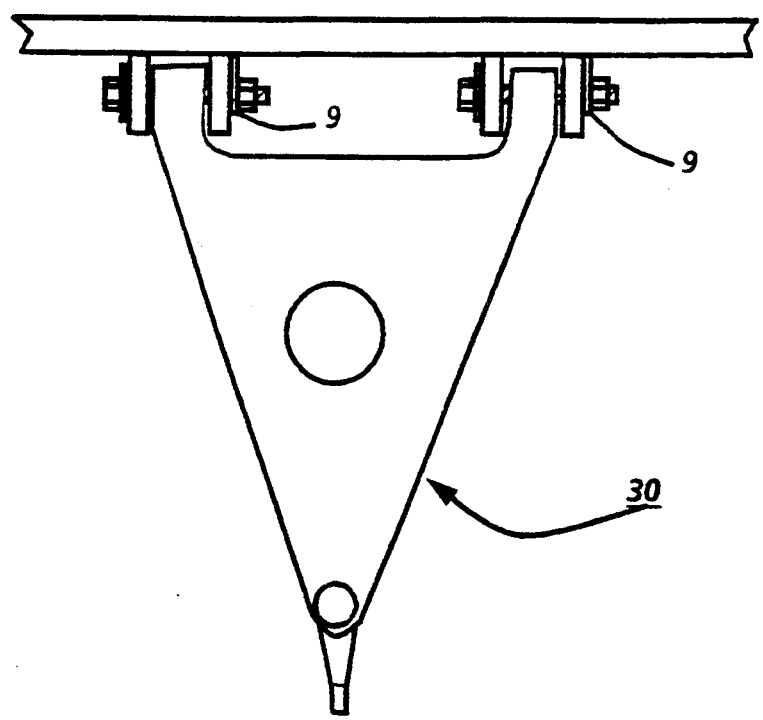
FIG. 9 illustrates a typical A-frame type suspension utilizing the adjusting element of the present invention.
Figure 10:
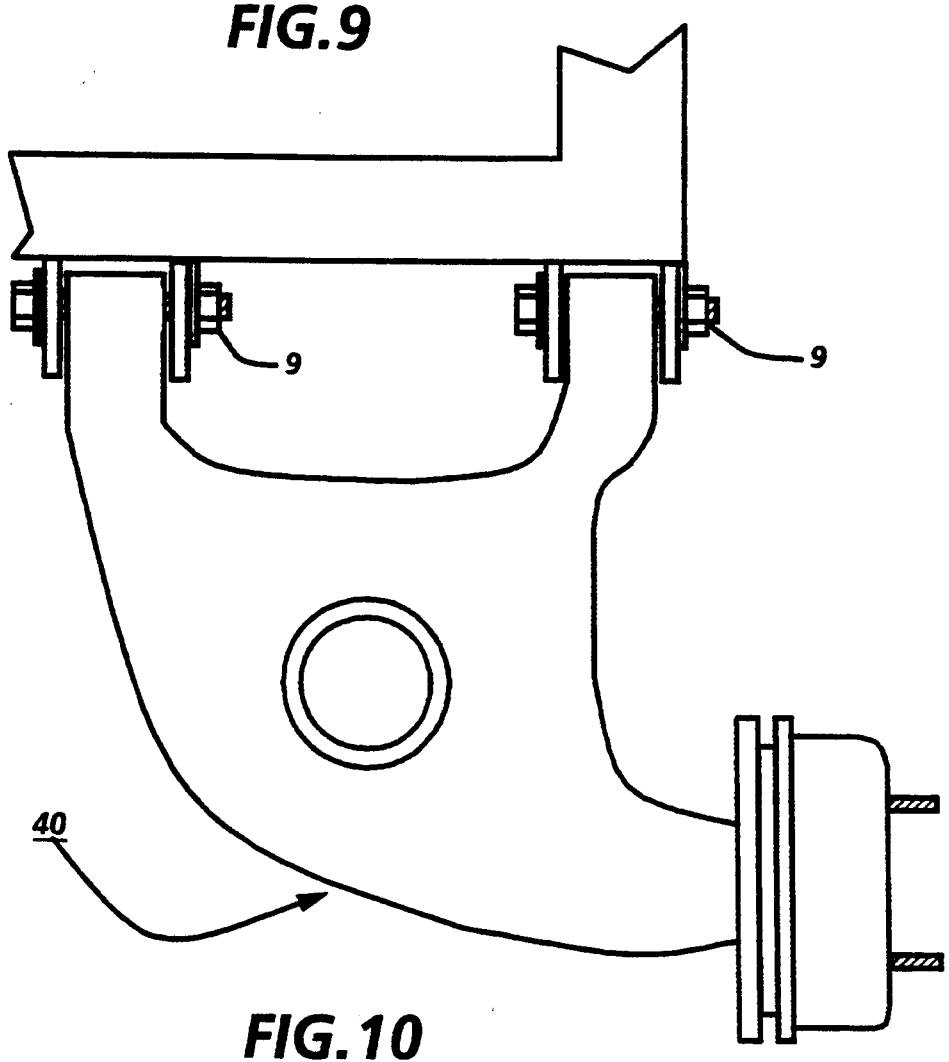
FIG. 10 illustrates a typical swing arm type suspension utilizing the adjusting element of the present invention.

FIGS. 9 and 10 illustrate the eccentric adjusting element 9 as installed on a typical A-frame 30 and swing arm type 40 suspension respectively.

It is also within the scope of this invention to perform the camber adjustment by the horizontal displacement of the top mounting bolt with the pivot point located at the bottom bolt.

Although only one embodiment of the invention has been disclosed and described, it is readily apparant that other embodiments and modifications to various types of independent suspensions are possible without departing from the scope of this invention.

What is claimed is:

1. A device for adjusting independently suspended wheels of a vehicle, said wheels supported on said vehicle by a link coupling and a wheel support comprising:
   an original equipment bolt comprising a head end and a round threaded shank attached to said head; and
   an alignment adjustment device, said adjustment device comprising a one piece eccentric nut-washer combination, said one piece eccentric nut-washer combination being rotatably adjustable in said link coupling, said link coupling having two legs, each said leg having two apertures, said one piece eccentric nut-washer combination comprising a flat washer having two substantially planar surfaces with a circular smooth hole radially offset from the midpoint of the outside diameter of said flat washer, with one of the substantially planar surfaces of said flat washer securedly fixed to a nut with said circular smooth hole axially aligned with the threaded bore of said nut wherein one of said link coupling apertures defines a slot adjacent the threaded shank end of said bolt, a shoulder formed on said link coupling adjacent said bolt, said one piece eccentric nutwasher combination being adapted to secure said bolt, said bolt extending through said link coupling and said wheel support, wherein rotation of said one piece eccentric nut-washer combination causes the shank end of said bolt to be offset in a substantially horizontal direction so as to effect a suspension alignment adjustment only on said leg of said link coupling having said slot.

2. The device as claimed in claim 1 for adjusting the camber of a wheel of said vehicle wherein said link coupling comprises a lower strut flange of a Macphearson strut which is securedly fixed to said vehicle; and said wheel support defines an upper and a lower substantially horizontal bore said upper bore corresponding to an upper aperture in said strut flange and said lower bore corresponding to the slot, which slot is a lower horizontal slot in at least the flange adjacent to the threaded shank end of said bolt of said strut flange, the slot being coaxially aligned with the axis of said lower bore in said wheel support, wherein said wheel support comprises a steering knuckle and wherein said alignment adjustment device is rotatably adjustable relative to said shoulder formed in said strut flange.

3. The device as claimed in claim 1 for adjusting the camber and caster of a wheel of said vehicle wherein said link coupling comprises a pair of fixed flanges attached substantially perpendicular to a main frame member of said vehicle, the first of said flanges having a substantially round aperture of said flanges defining the slot, which slot is substantially perpendicular in alignment to said frame member, the hole and the slot being aligned with a substantially horizontal bore in said wheel support, said original equipment standard bolt passing through the aperture in the first of said flanges, the horizontal bore in the second of said wheel support and the slot in said flanges and is attached and secured by said alignment adjustment device which said alignment adjustment device is rotatably adjustable relative to said frame member wherein rotation of said adjustment device causes said bolt to be displaced in a substantially horizontal direction to effect suspension alignment adjustment.

4. The device as claimed in claim 3 wherein said wheel support comprises a typical A-frame type suspension attached to said frame member by a plurality of said link couplings.

5. The device as claimed in claim 3 wherein said wheel support comprises a typical swing arm-type suspension attached to said frame member by a plurality of said link couplings.

6. An aftermarket device for adjusting independently suspended wheels of a vehicle, said wheels supported on said vehicle by a link coupling and a wheel support comprising:
   an original equipment bolt comprising a head end and a round threaded shank attached to said head; and
   an alignment adjustment device, said adjustment device comprising a one piece eccentric nut-washer combination, said one piece eccentric nut-washer combination being rotatably adjustable in said link coupling, said link coupling having two legs, each said leg having two apertures, said one piece eccentric nut-washer combination comprising a flat washer having two substantially planar surfaces with a circular smooth hole radially offset from the midpoint of the outside diameter of said flat washer, with one of the substantially planar surfaces of said flat washer securedly fixed to a nut with said circular smooth hole axially aligned with the threaded bore of said nut wherein one of said link coupling apertures defines a slot adjacent the threaded shank end of said bolt, a shoulder formed on said link coupling adjacent said bolt, said one piece eccentric nut-washer combination being adapted to secure said bolt, said bolt extending through said link coupling and said wheel support, wherein rotation of said one piece eccentric nut-washer combination causes the shank end of said bolt to be offset in a substantially horizontal direction so as to effect a suspension alignment adjustment only on said leg of said link coupling having said slot.

7. The device as claimed in claim 6 for adjusting the camber of a wheel of said vehicle wherein said link coupling comprises a lower strut flange of a Macphearson strut which is securely fixed to said vehicle; and said wheel support defines an upper and a lower substantially horizontal aperture said upper aperture corresponding to an upper aperture in said strut flange and said lower bore corresponding to the slot, which slot is a lower horizontal slot in at least the flange adjacent to the threaded shank end of said bolt of said strut flange, the slot being coaxially aligned with the axis of said lower bore in said wheel support, wherein said wheel support comprises a steering knuckle and wherein said alignment adjustment device is rotatably adjustable relative to said shoulder formed in said strut flange.

8. The device as claimed in claim 6 for adjusting the camber and caster of a wheel of said vehicle wherein said link coupling comprises a pair of fixed flanges attached substantially perpendicular to a main frame member of said vehicle, the first of said flanges having a substantially round aperture and the second of said flanges defining the slot, which slot is substantially perpendicular in alignment to said frame member, the hole and the slot being aligned with a substantially horizontal bore in said wheel support, said original equipment standard bolt passing through the aperture in the first of said flanges, the horizontal bore in the second of said wheel support and the slot in said flanges and is attached and secured by said alignment adjustment device which said alignment adjustment device is rotatably adjustable relative to said frame member wherein rotation of said adjustment device causes said bolt to be displaced in a substantially horizontal direction to effect suspension alignment adjustment.

9. The device as claimed in claim 8 wherein said wheel support comprises a typical A-frame type suspension attached to said frame member by a plurality of said link couplings.

10. The device as claimed in claim 8 wherein said wheel support comprises a typical swing arm-type suspension attached to said frame member by a plurality of said link couplings.

* * * * *